(12) United States Patent
Borg et al.

(10) Patent No.: US 6,283,711 B1
(45) Date of Patent: Sep. 4, 2001

(54) MODIFIED SAVONIUS ROTOR

(76) Inventors: John L. Borg, 8200 Toro Creek Rd., Atascadero, CA (US) 93422; Kenneth C. Morisseau, 1755 Wagoneer Rd., Paso Robles, CA (US) 93446

( * ) Notice: Subject to any disclaimer, the term of this patent is extended or adjusted under 35 U.S.C. 154(b) by 0 days.

(21) Appl. No.: 09/523,967

(22) Filed: Mar. 13, 2000

(51) Int. Cl.[7] .............................. B63H 1/06; B64H 11/16; F01D 3/12
(52) U.S. Cl. ........................................ 416/135; 416/197 A
(58) Field of Search ........................... 416/132 R, 132 A, 416/132 B, 135, 197 R, 197 A

(56) References Cited

U.S. PATENT DOCUMENTS

| | | | |
|---|---|---|---|
| 1,200,308 | * 10/1916 | Bunnell | 416/197 A X |
| 1,646,673 | * 10/1927 | Wilson | 416/197 A X |
| 1,697,574 | 1/1929 | Savonius . | |
| 1,766,765 | 6/1930 | Savonius . | |
| 2,007,963 | * 7/1935 | Cleveland | 416/197 A X |
| 3,645,694 | * 2/1972 | Flatau | 416/197 R X |
| 3,942,909 | * 3/1976 | Yengst | 416/197 A X |
| 4,005,947 | * 2/1977 | Norton et al. | 416/197 A |
| 4,177,009 | * 12/1979 | Baum, Sr. et al. | 416/197 A X |
| 4,274,011 | * 6/1981 | Garfinkle | 416/132 B X |
| 4,292,540 | * 9/1981 | Thompson et al. | 416/171 X |
| 4,718,822 | * 1/1988 | Riezinstein | 416/197 A X |

FOREIGN PATENT DOCUMENTS

| | | | |
|---|---|---|---|
| 1132053 | * 9/1982 | (CA) | 416/197 A |
| 60-145464-A | * 7/1985 | (JP) | 416/197 A |
| 62-82280-A | * 4/1987 | (JP) | 416/197 A |
| 65940 | * 12/1924 | (SE) | 416/197 A |

* cited by examiner

Primary Examiner—John E. Ryznic
(74) Attorney, Agent, or Firm—Daniel C. McKown

(57) ABSTRACT

The rotor consists of two airfoils symmetrically disposed around an axis of rotation. Each airfoil consists of an outer vane having a leading edge and a trailing edge and an inner vane having a trailing edge and having a leading edge attached to the trailing edge of the outer vane. The outer vane has a radius R and extends not more than 90 degrees around the axis of rotation. The inner vane extends 180 degrees around an axis that is parallel to but displaced from the axis of rotation. The radius of the inner vane is a fraction, between 0.6 and 0.8, of the radius of the outer vane. Automatic limitation of the speed of rotation is achieved in one embodiment by letting centrifugal force deform the inner vanes so as to reduce the cross sectional area of the air flow path through the rotor.

5 Claims, 3 Drawing Sheets

MODIFIED SAVONIUS ROTOR

BACKGROUND OF THE INVENTION

1. Field of the Invention

The present invention is in the field of aerodynamics and specifically relates to a rotating airfoil that could be used, for example, as a wind motor to generate a torque; or alternatively, it could be driven to serve as a propeller or lift-generating device.

2. The Prior Art

In U.S. Pat. No. 1,697,574 issued Jan. 1, 1929, Savonius describes a rotor that now bears his name. In his own words, "the vane rotor consists of two oppositely arranged hollow shaped vanes of predominantly rectilinear generatrix, the inner edge of each vane catching the segmental space bordered by the other vane, both vanes thus forming an air passage being adapted to force the air current from the hollow side of one of said vanes to the hollow side of the other vane in an S-like passage of substantially constant area."

Today, to workers in this field, the term "Savonius rotor" suggests a family of structures characterized by two cylindrical-shaped sheets, disposed symmetrically about an axis of rotation, with their concave surfaces facing each other. A number of variations have been tried; typically they involved altering the separation between the vanes or using the centrifugal force resulting from rotation of the rotor to alter the shape of the vanes to automatically limit or control the rotational speed. Such a technique is described in U.S. Pat. No. 1,766,765 issued Jun. 24, 1930 to Savonius.

The present invention is not merely another variation of the dimensions of the rotor. Instead the present invention consists of a new and beneficial vane shape that improves the performance of the rotor.

SUMMARY OF THE INVENTION

In accordance with the present invention, the leading edge of each vane is extended forward at a constant radius from the axis of rotation through an angle not exceeding 90 degrees about the axis of rotation. This simple addition to the basic Savonius rotor results in greater torque and higher rotational speed.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
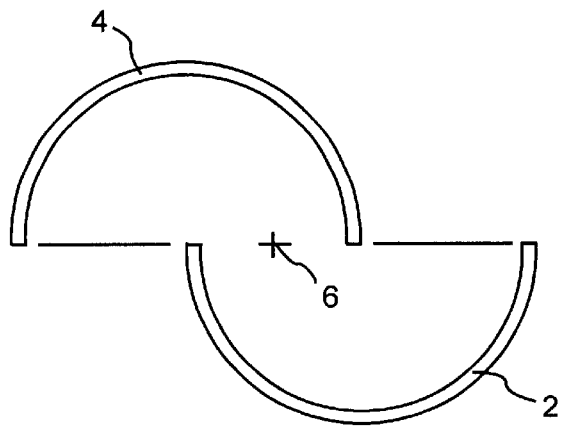
FIG. 1 is a diagram showing a cross sectional view perpendicular to the axis of rotation of a Savonius rotor of a type known in the prior art.

FIG. 1 shows a type of Savonius rotor configuration that is typical of the prior art. It consists of two vanes 2 and 4 that are symmetrically disposed about the axis of rotation 6. The type of symmetry involved here is symmetry with respect to a point, the point being the projection of the axis of rotation onto a plane perpendicular to the axis of rotation. Each point on one of the vanes may be projected through the axis of rotation to a corresponding point on the other vane equidistant from the axis of rotation. Typically, the vanes 2 and 4 have a circular cross section that extends through 180 degrees of arc.

Figure 2:
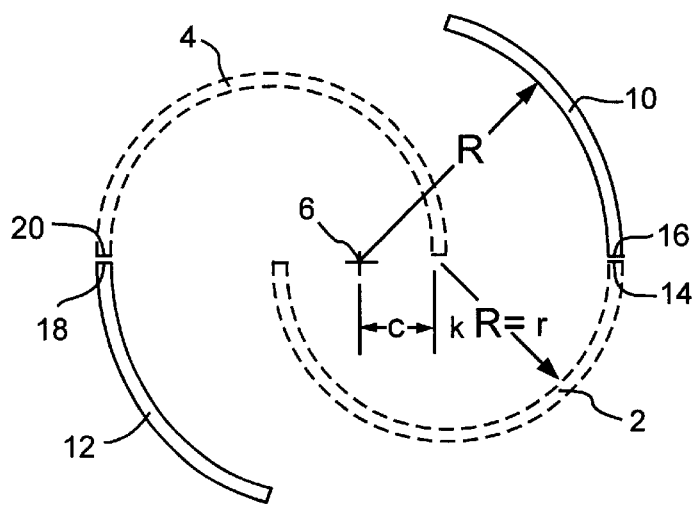
FIG. 2 is a diagram showing a cross sectional view perpendicular to the axis of rotation and showing the improvement of the present invention in solid lines and the rotor of FIG. 1 in dashed lines.

The diagram of FIG. 2 shows the vanes 2, 4 of FIG. 1 in dashed lines. The present invention is shown in solid lines in FIG. 2. It consists of the addition of two outer vanes 10 and 12. The outer vanes 10 and 12 are cylindrical and have a larger radius of curvature R than the inner vanes 2 and 4. The radius of curvature of the inner vanes 2 and 4 may therefore expressed as KR, where K is a number between 0.6 and 0.8. The outer vanes 10 and 12 are centered on the axis of rotation 6, but the centers of the inner vanes 2 and 4 are displaced from the axis of rotation 6 by an amount equal to (1−K)R. The leading edge 14 of the inner vane 2 is connected to the trailing edge 16 of the outer vane 10. Likewise, the trailing edge 18 of the outer vane 12 is connected to the leading edge 20 of the inner vane 4. Vane 2 is tangent to vane 10 at the point where they are connected, and likewise vane 4 is tangent to vane 12 at the point where they are connected.

Alternatively, the radius of the inner vane may be denoted by r, and the distance of its axis from the axis of rotation may be denoted by c. The radius R of the outer vane is then equal to r+c, and it can be shown that R equals c divided by (1−K).

Figure 3:
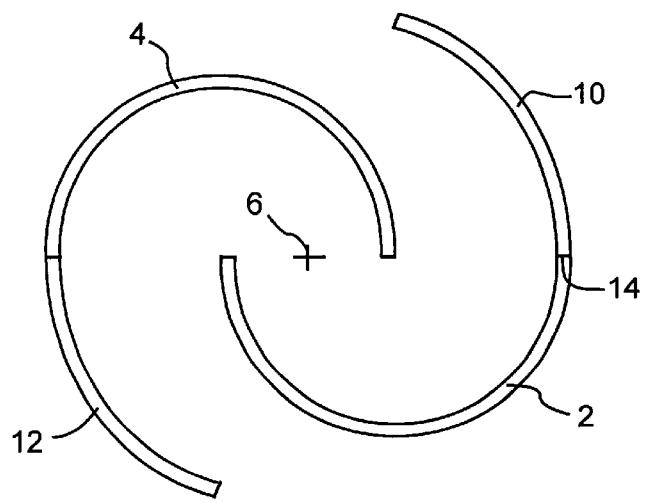
FIG. 3 is a diagram showing the improved rotor of the present invention in a preferred embodiment.

The vanes 10 and 12 each subtend an arc not exceeding 90 degrees about the axis of rotation and the vanes 2 and 4 subtend arcs of 180 degrees about their centers. Thus, as seen in FIG. 3, the rotor consists of two airfoils of the same shape arranged symmetrically about the axis of rotation, the one airfoil, consisting of vanes 10 and 2, being rotated 180 degrees from the other airfoil, consisting of the vanes 12 and 4. As viewed from the axis of rotation 6, each airfoil subtends an angle greater than 180 degrees but not exceeding 270 degrees of arc.

The circular cross sectional shape of the vanes, compared to some non-circular shapes that have been proposed, reduces the cost of manufacturing the rotor, because circular mandrels are less expensive.

As can be seen from FIG. 3, the farther the vane 10 extends ahead of the leading edge 14 of the inner vane 2, the closer it approaches the inner vane 4, thereby reducing the space through which wind enters the rotor.

Up to about 50 degrees, each increment in extension produces an increase in performance. However, increments beyond about 50 degrees result in lesser increases in performance, because the decreasing space between the outer vane 10 and the inner vane 4 reduces the flow of air through the rotor.

How far the outer vane should extend ahead of the leading edge of the inner vane may have to be optimized for each intended use of the rotor, based on the torque, speed and power required for the intended use. The inventors have determined that in no case should the extension exceed 90 degrees. In the preferred embodiments, the extension is between 30 degrees and 80 degrees.

Figure 4:
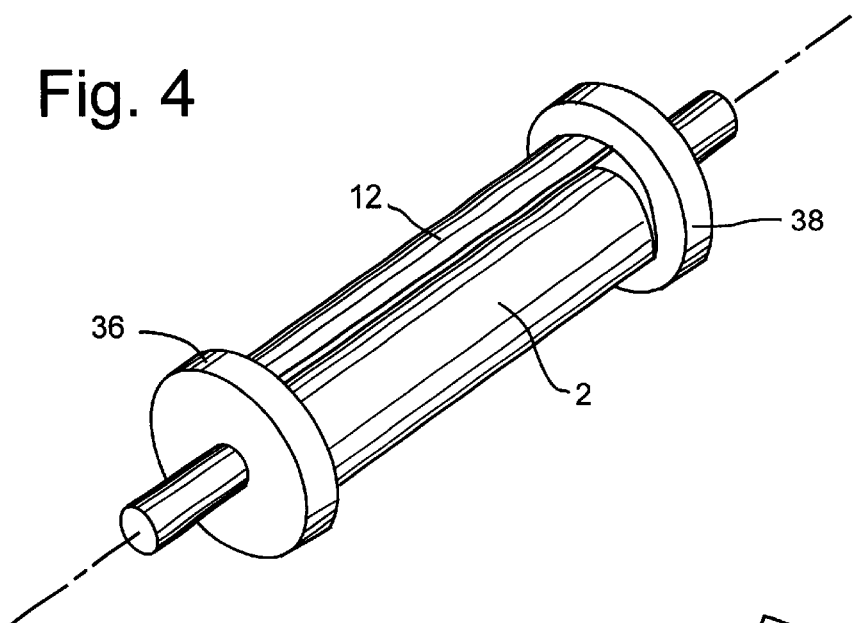
FIG. 4 is a perspective view of a rotor in accordance with the present invention.

The intended use of the airfoil also determines the configuration of the structure used for holding the vanes 2, 4, 10 and 12 in the relative positions shown in FIG. 3. For example, the vanes may be attached at their ends to circular disks 36, 38 that are perpendicular to the axis of rotation, as shown in FIG. 4.

Figure 5:
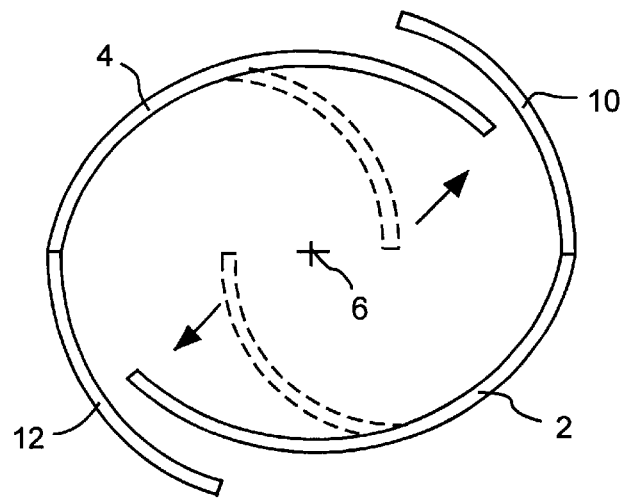
FIG. 5 is a diagram illustrating a first alternative embodiment of the present invention.

In a first alternative embodiment, the outer vanes 10 and 12 are rigid, or are mounted or supported so as to be rigid. The inner vanes 2 and 4 are not rigid; they are stiff but somewhat flexible. Also, the vanes 2 and 4 are mounted in such a way that their trailing edges can flex outwardly, as shown in FIG. 5, from the axis of rotation under the influence of the centrifugal force generated by their rotation. This outward flexing of the trailing portions of the vanes 2 and 4 restricts the cross sectional area of the passage through which air flows within the rotor. The restricted flow causes the rotor to produce less torque and less useful energy, with the result that the rotational speed of the rotor decreases. Thus, this alternative embodiment can be designed to have a chosen maximum speed of rotation that is not exceeded regardless of the speed of the wind. This protects the rotor and any associated apparatus from damage by abnormally high winds or gusts.

Figure 6:
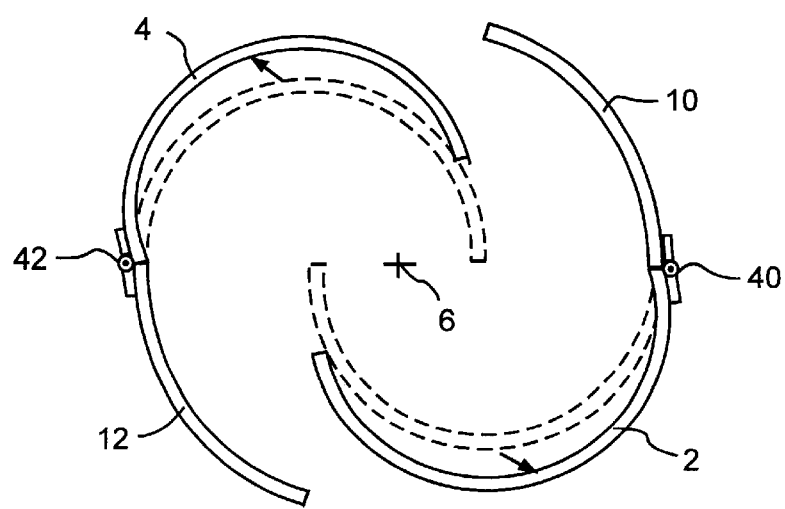
FIG. 6 is a diagram illustrating a second alternative embodiment of the present invention.

In a second alternative embodiment, a similar effect can be obtained using rigid vanes 2 and 4, by employing hinges 40 and 42 to connect the leading edges of the vanes 2 and 4 to the trailing edges of the vanes 10 and 12, respectively, as shown in FIG. 6. The hinge mechanism could include a mechanical stop to limit inward movement of the vanes 2 and 4, and could further include a torsion spring to yieldingly oppose outward movement of the vanes 2 and 4. Hinges of this type are sometimes used on gates and doors.

Figure 7:
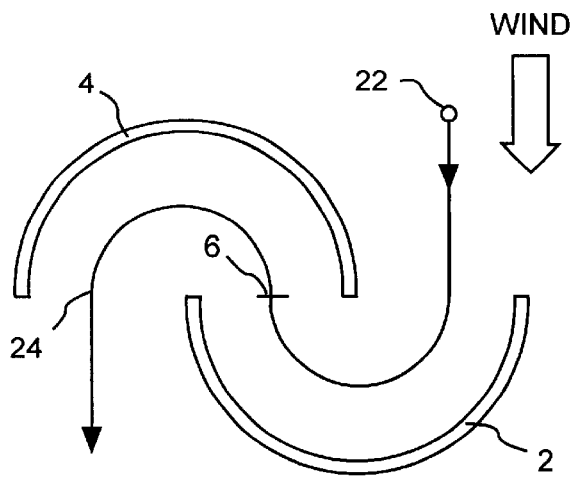
FIG. 7 is a diagram showing the flow path of a small volume of air through the prior art rotor of FIG. 1; and, FIG. 8 is a diagram showing the flow path of a small volume of air through the rotor of the present invention.
Figure 8:
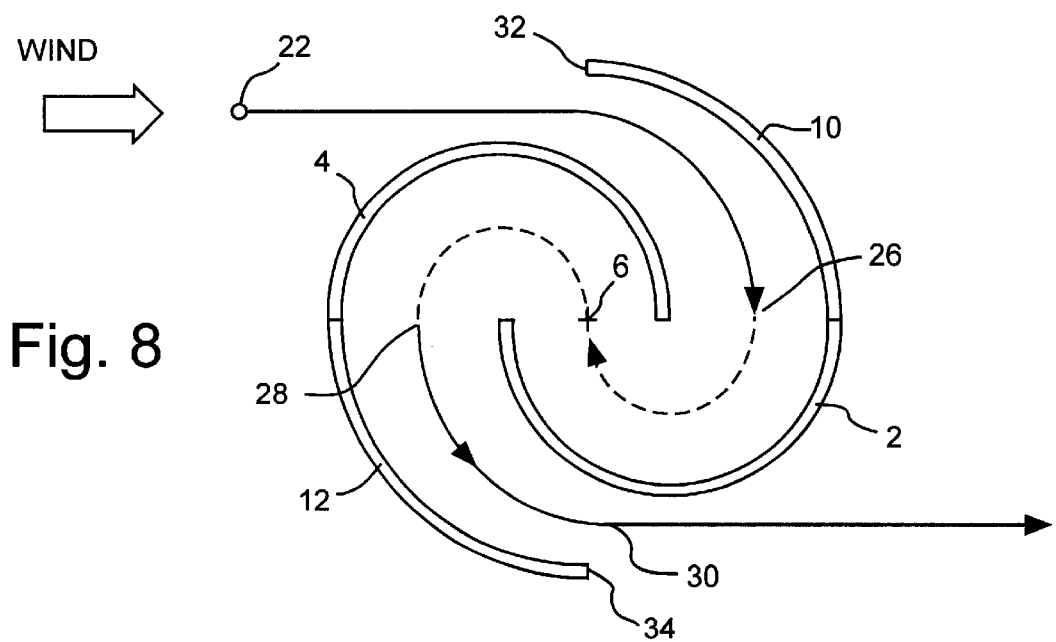

FIGS. 7 and 8 are diagrams showing the path of a small packet of air 22 as it flows through the rotor of the prior art in FIG. 7, and through the rotor of the present invention in FIG. 8. The rotors of FIGS. 7 and 8 are assumed to be used as wind motors, notwithstanding the fact that rotors of this general type can be used, and have been used, in water. A heuristic argument will now be developed for comparing the effectiveness of the rotor of the present invention with that of the prior art. For purposes of this argument, the outer vanes are chosen to extend 90 degrees ahead of the leading edges of the inner vanes, as shown in FIG. 8.

Let $v_0$ denote the speed of the packet 22 as it enters the rotor, $v_1$ denote the speed of the packet at the axis of rotation 6, and $v_d$ denote the speed of the packet as it is discharged from the rotor. Let m denote the mass of the packet.

Remembering that momentum is a vector quantity, it is seen that in progressing from its initial position to the axis of rotation 6 of FIG. 7, the packet 22 has imparted a momentum equal to $m(v_0+v_1)$ to the vane 2. Similarly, in progressing from the axis of rotation 6 to the discharge position 24 the packet has imparted a momentum equal to $m(v_1+v_d)$ to the vane 4. Thus, the total momentum imparted to the rotor is $m(v_0+v_d+2v_1)$. Assuming $v_1$ is the average of $v_0$ and $v_d$, the total amount imparted is $4mv_1$ for the prior art rotor of FIG. 7.

Turning now to FIG. 8, it is seen that the same principles apply to the dashed portion of the path of the packet 22. However in FIG. 8 additional momentum is imparted to the vane 10 as the packet travels from its initial position to the position 26. Assuming the packet loses none of its speed in traveling from its initial position to the position 26, the amount of momentum transferred to the vane 10 is $mv_0$, since upon reaching the position 26 the packet has lost all of its momentum in the original direction. Similarly, in traveling from the position 28 to the discharge position 30, the packet has acquired momentum in the direction of its discharge equal to $mv_d$, $v_d$ is the discharge velocity, and therefore in traveling from position 28 to position 30 the packet must have imparted the same amount of momentum, but in the opposite direction, to the vane 12.

Thus, the additional momentum transferred in FIG. 8 (compared to FIG. 7) is $mv_0+mv_d$. Assuming that $v_0+v_d$ equals $2v_1$, the total momentum transferred to the rotor in FIG. 8 is $6mv_1$, compared to $4mv_1$ in the prior art rotor of FIG. 7-a 50 percent improvement, theoretically.

In the above argument, the rotation of the rotor has been neglected, or alternatively, the rotor is only starting to turn. Rotation of the rotor has the effect of reducing $v_0$ by the linear speed of the leading edge 32 and of increasing $v_d$ by the linear speed of the trailing edge 34. Assuming again that $v_1$ is the average of the intake and discharge speeds, it is seen that the improvement in momentum transfer, at least to a first approximation, obtains at all rotational speeds of the rotor.

Thus, there has been described a novel modified Savonius rotor that differs from the classical Savonius rotor by the addition of an outer vane to the leading edge of each of the Savonius vanes. Viewed from the axis of rotation, the improved vane of the present invention subtends a substantially greater arc than the 180 degrees of the original Savonius rotor, thereby permitting the momentum of the wind stream to be transferred to the rotor more effectively.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. An improvement in a Savonius rotor that has a cylindrical inner vane of semicircular cross section of radius r centered on a vane axis parallel to the axis of rotation of the rotor but displaced from it by a distance equal to c, and having a leading edge located on a line passing through the axis of rotation and the vane axis, the improvement comprising:

an outer cylindrical vane of arcuate cross section, centered on the axis of rotation of the rotor, having a radius equal to r+c, and having a trailing edge that is joined tangentially to the leading edge of the cylindrical inner vane.

2. An airfoil for use in a modified Savonius rotor having an axis of rotation, comprising:

a cylindrical outer vane having an axis coincident with the axis of rotation and extending not more than 90 degrees around the axis of rotation from a leading edge to a trailing edge;

a cylindrical inner vane having an axis parallel to but spaced from the axis of rotation and extending 180 degrees around its axis from a leading edge to a trailing edge, the leading edge of the inner vane connected to and cotangent with the trailing edge of said outer vane;

said cylindrical outer vane having radius R and said inner vane having a radius KR where K is less than one.

3. The airfoil of claim 2 where K is between 0.6 and 0.8.

4. The airfoil of claim 2 wherein said cylindrical outer vane is substantially rigid and said cylindrical inner vane is elastically deformable outwardly from the axis of rotation in relation to centrifugal force resulting from rotation of the rotor.

5. The airfoil of claim 2 further comprising a hinge connecting the leading edge of said cylindrical inner vane to the trailing edge of said cylindrical outer vane.

* * * * *